United States Patent
Runnels et al.

(10) Patent No.: US 7,687,592 B2
(45) Date of Patent: Mar. 30, 2010

(54) HYDROPHILIC SILICONES

(75) Inventors: Fred Runnels, Seattle, WA (US);
Walter Dandliker, La Jolla, CA (US);
Leonard William Luria, Tampa, FL (US)

(73) Assignee: One Unlimited, Inc., Tampa, FL (US)

( * ) Notice: Subject to any disclaimer, the term of this patent is extended or adjusted under 35 U.S.C. 154(b) by 752 days.

(21) Appl. No.: 11/542,996

(22) Filed: Oct. 4, 2006

(65) Prior Publication Data

US 2008/0085986 A1   Apr. 10, 2008

(51) Int. Cl.
*C08G 77/18* (2006.01)

(52) U.S. Cl. ............... 528/29; 528/499; 528/502 A; 528/502 D; 210/767

(58) Field of Classification Search .............. None
See application file for complete search history.

(56) References Cited

U.S. PATENT DOCUMENTS

| 3,133,111 | A | * | 5/1964 | Wheeler, Jr. ............. 556/446 |
| 3,600,418 | A | * | 8/1971 | Bailey et al. ............. 556/446 |
| 4,172,186 | A | * | 10/1979 | Scott et al. .............. 521/112 |
| 4,431,789 | A |   | 2/1984 | Okazaki et al. |
| 4,487,809 | A | * | 12/1984 | Koerner et al. ............ 428/447 |
| 5,073,195 | A |   | 12/1991 | Cuthbert |
| 5,144,054 | A | * | 9/1992 | Shioya et al. ............. 556/445 |
| 5,208,360 | A | * | 5/1993 | Ward et al. .............. 556/444 |
| 5,871,558 | A |   | 2/1999 | Takei |
| 6,251,981 | B1 |  | 6/2001 | Tanaka |
| 6,258,969 | B1 |  | 7/2001 | Sawai et al. |
| 6,790,451 | B2 |  | 9/2004 | Nakanishi |
| 2004/0146472 | A1 | | 7/2004 | Nakanishi |
| 2004/0236003 | A1 | | 11/2004 | Del Torto et al. |
| 2005/0033002 | A1 | | 2/2005 | Kishan |
| 2007/0049716 | A1 | | 3/2007 | Sayre |

OTHER PUBLICATIONS

Jayakannan et al., Preparation of polyethers via proton acid catalyzed transetherification reactions, Macromol, Chem. Phys., 2000, pp. 759-767, 201, No. 7, India.

Pratt, et al., Reaction Rates by Distillation, The Etherification of Phenylcarbinols . . . , Dept. of Chemistry, Univ. of MD., 1949, pp. 2846-2849, vol. 71.

\* cited by examiner

*Primary Examiner*—Marc S Zimmer

(74) *Attorney, Agent, or Firm*—Gottlieb, Rackman & Reisman

(57) ABSTRACT

A process for producing a soluble silicone product is provided. The process includes the steps of chemically reacting a polydialkoxysiloxane with an aliphatic alcohol with or without a catalyst in a reaction mixture, removing produced alcohol from the mixture; recovering the water soluble portion of produced silicone product, purifying the water soluble portion; and recovering hydrophilic material in the water insoluble portion.

25 Claims, No Drawings

HYDROPHILIC SILICONES

BACKGROUND OF THE INVENTION

This invention relates to the chemical modification of polyalkoxy siloxanes by reaction with alcohols and to useful applications of the products. This reaction with alcohols makes it feasible to produce numerous polysiloxanes with new properties and to customize the chemical structures for specific applications. In particular, the invention focuses on "hydrophilic silicones," i.e., polysiloxanes substituted with hydrophilic groups, for imparting hydrophilic properties, or if the degree of substitution is sufficient, resulting in water solubility.

Liquid silicone polymers, such as polydimethoxylsiloxane, have a very low solubility in water or aqueous solutions. In order to accommodate this property, they can be emulsified with the aid of surfactants in order to form aqueous emulsions, possibly stable for long periods or even indefinitely. Such emulsions consist of a suspension of very small droplets of liquid silicone, perhaps visible microscopically, but more easily characterized and monitored by light scattering. Despite the inherent instability of most emulsions, many cosmetics products are successfully based on emulsification. This has resulted from extensive experimentation in selecting the optimal surfactant and in confirming the emulsion stability of the product over an appropriate time period.

In order to provide water soluble silicones, there have also been prior art methods to chemically modify the silicone structure to circumvent the need for emulsification. These include dimethicone polyols (Siltech), cyclomethicones (Clearco) and polyesters (Zenitech). In contrast to the inventive goals, the reaction between alcohols and alkoxysiloxanes has been used to introduce hydrophobic properties; wood contains hydroxyl groups and, as a finely divided flour, has been reacted with oligoethoxysilioxanes to produce a solid material with low water affinity and compatibility with hydrocarbon polymers.

SUMMARY OF THE INVENTION

Generally speaking, in accordance with the invention, a chemically modified silicone structure that is hydrophilic or water soluble to the extent needed for a particular application is provided.

More particularly, there is disclosed a process to produce a silicone compound that is modified by a reaction with an alcohol such as glycerol, a component used in cosmetics for many years and known for its soothing and softening of skin texture and for the lack of side reactions. The formation of this type of water soluble silicone is achieved by the chemical reaction between aliphatic alcohols and alkoxy groups on the silicon. Specifically, the invention uses the reaction between polydimethoxysiloxane and glycerol, as follows:

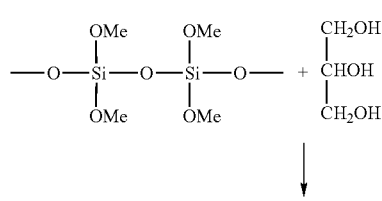

Equation (1)

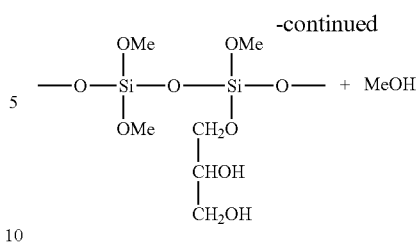

The mechanism of this reaction involves a nucleophilic attack on the silicon atom by the oxygen of a terminal hydroxyl group of the glycerol in order to form the —CH$_2$—O—Si— linkage. This linkage is then probably protected to some extent against hydrolysis by the presence of the glycerol moiety.

The inventive reaction may be subject to catalysis by acids and/or bases and may also require heating in order to attain reasonable reaction rates. The reaction can be driven to completion by removal of the methanol that is formed as the reaction proceeds. This can be accomplished by bubbling air or nitrogen through the reaction mixture.

The structural similarity between the reactants and products of the inventive reaction suggests that the changes in free energy are small and that the position of equilibrium can be easily manipulated.

Importantly, complete removal of produced methanol is required because of both the influence of residual methanol on yield and the toxicity of methanol itself. Consideration of these factors somewhat suggests that methoxy silicones are not necessarily preferred as the starting materials for products that are intended for human use. Instead, if only ethoxy substituents are used, any hydrolysis produces only ethanol which is of very low toxicity. While it is unlikely that appreciable hydrolysis occurs either in storage or on the skin, if only ethoxy groups are present, slight hydrolysis thus becomes much less important.

In accordance with the invention, a similar reaction with 2-bromo-2-nitropropane-1,3-diol (sold commercially as Bronopol), which also has primary alcoholic hydroxyl groups, is possible with alkoxysiloxanes.

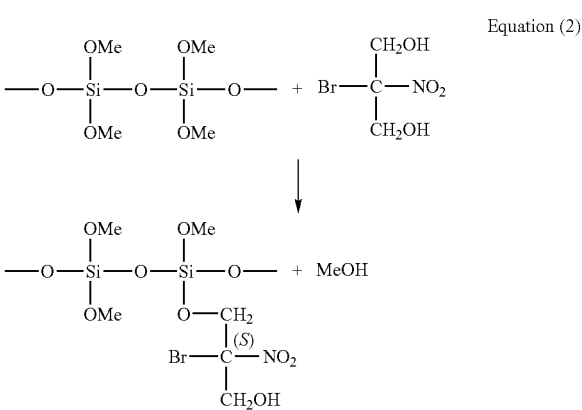

Equation (2)

The use of the above reaction results in making possibly both the antibacterial action and the water solubility of Bronopol an integral part of the resulting silicone molecules.

The modified silicones of the invention, when used in cosmetics, require no emulsification and should be stable in solution for long periods of time.

It is thus an object of the invention to produce silicones with hydrophilic properties possibly varying from slight water adsorption to the extreme of water solubility.

Another object of the invention is to produce silicone polymers that are rendered water soluble without the need for emulsification.

A further object of the invention is to produce hydrophilic silicones by reacting a silicone compound with an alcohol.

Still another object of the invention is to produce a hydrophilic silicone by reacting a polysiloxane with an alcohol.

Still other objects and advantages of the invention will be made obvious from the following description.

DETAILED DESCRIPTION OF THE INVENTION

A method of preparing a water soluble silicone is provided. The method comprises the reaction between a polydialkoxysiloxane (the alkoxy usually being either methoxy or ethoxy) and an alcohol, such as glycerol, Bronopol, or mixtures of glycerol and Bronopol. In the inventive process, the alkoxy group of the silicone undergoes a reaction with an aliphatic hydroxyl group of the alcohol in order to form an —Si—O—CH$_2$— configuration with the alkoxy group of the alcohol. This reaction has been referred to in the past as "transetherification."

To carry out this reaction, the polydialkoxysiloxane is mixed with the alcohol, with or without the addition of a catalyst. Progress of the reaction is monitored by sampling the reaction mixture and testing for the appearance of water-soluble material. If the reaction velocity is inconveniently low, it may be increased by heating the reaction mixture. When a satisfactory amount of water-soluble material has been produced and recovered, the catalyst, if any, is removed or neutralized and the water-soluble fraction of the reaction mixture is purified, preferably by means of chromatography.

In general, what has been discovered is that certain alcohols react under mild conditions with alkoxy groups situated on a polysiloxane chain in order to undergo what could be termed an "exchange reaction" or a "transetherification"; for example, the methoxy or ethoxy groups of the polyalkoxysiloxane are lost as methanol or ethanol while the alkoxy moiety of the reacting alcohol (usually of higher boiling point than that of methanol or ethanol) is bound to the polysiloxane. The inventive reaction thus provides a simple and rapid methodology for the modification of the chemical and physical properties of "silicones" having alkoxy groups in order to produce new chemical structures suitable for numerous applications.

The reaction with alkoxy groups requires a free alcohol group which has been in the past a primary, aliphatic group. It seems likely that reaction can be obtained also with secondary or tertiary groups, or with phenols, but probably with greatly decreased rates. The chemical reaction involved can be represented by the following equation:

Equation 3

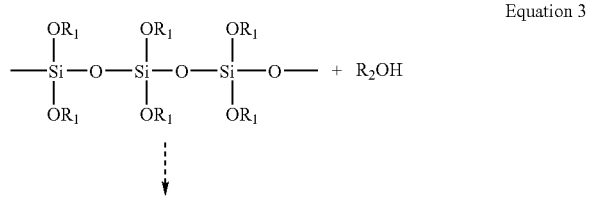

-continued

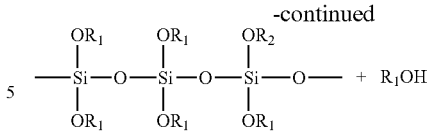

In theory, the above reaction is probably readily reversed so that, in a closed system, equilibrium would likely be reached in which all the species indicated would be present at concentrations not drastically different from each other. However, if the reactive groups on the silicone are methoxy or ethoxy, while R$_2$ is somewhat larger, the above reaction will easily go to completion by allowing the more volatile product to escape. In the present invention, two alcohols (R$_2$OH), namely, glycerol and Bronopol are preferred, but other alcohols can be used for the inventive reactions without departing from the scope of the invention.

Modifying silicones in accordance with the invention produces materials that are suitable as bases for numerous dermatological preparations, both human and veterinary. In addition, possible uses may be found as materials of construction, paints and coatings for home, agricultural and industrial products where some affinity for water is desirable. The inventive material is both water soluble and compatible with human skin, where it is able to form an extremely thin film on it. This film resists washing with water and imparts a feeling of softness, while protecting the skin from bacterial and fungal invasion by virtue of added protective agents.

The inventive reaction is carried out on a practical scale by mixing the alkoxypolysiloxane, usually methoxy or ethoxy, with the alcohol to be coupled to the silicone and then heating at between about 140°-300° F. for 20 hours or more. The addition of an acidic catalyst, such as hydrochloric acid or trichloroacetic acid, or a basic catalyst, such as N-ethyldiisopropylamine or triethylamine, to the reaction may be found useful in achieving desired reaction rates. If the substituting alcohol has, in addition to the hydroxyl group consumed in the coupling reaction, additional hydrophilic groups, the polysiloxane product may be water soluble.

After heating the reaction mixture and then cooling to room temperature, the water soluble portion can be obtained by mixing with water and recovering the water soluble portion by centrifugation, decantation or filtration. The residue left after the extraction with water may be expected to contain polysiloxane species that have reacted with a number of alcohol molecules too few to give water solubility but, nevertheless, with a sufficient number to become very hydrophilic. Such material may prove to be well suited for incorporation into dermatological salves and creams or other products where some wettability is desirable.

The water soluble material produced by the inventive process is then preferably fractionated, either by size exclusion chromatography (SEC) or high performance liquid chromatography (HPLC). Fractionation by HPLC could serve to separate reaction produced products into many categories with slightly varying properties. This would reflect the enormous number of ways in which the polysiloxane structure may be substituted, both with respect to the degree of substitution and with respect to the arrangement of substituent groups along the polysiloxane chain.

Silicones substituted with glycerol or Bronopol, or combinations of the two, can be quite water soluble and, when applied in aqueous solution to the skin, leave a very thin film on the skin. They can impart also an hydrophobicity and an exceptionally smooth texture, which remains despite repeated exposures to water. The water solubility of such modified silicones strongly suggests that hydrophobic interactions between the polysiloxane and the skin are taking place. The modified silicones of the invention may promote healing in burn cases, both in terms of accelerating the healing process and in moderating pain.

The inventive silicone products could also be used as additions to finishes for many manufactured products since such additions discourage the accumulation of dust or other airborne contaminants. They are also potentially useful as a special class of lubricants since they could be attached covalently to surfaces using the reaction described in the equations set forth above, provided that the surface to be treated has free alcoholic —OH groups to act as an anchor for the polysiloxane.

Experimental results showing the feasibility for the synthesis of hydrophilic silicones by reacting polyalkoxysiloxones with aliphatic alcohols are given in Table 1 below along with a brief indication of some of the properties of these products:

TABLE 1

| Example | Silicone substituents | Amt Silicone | Amt Glycerol | Amt Bronopol | Hrs. @ 200° F. | Result |
| --- | --- | --- | --- | --- | --- | --- |
| 214-112-7 | —O Me | 5 ml | 2 ml | 3 g | 20 | Transparent gel indicating extensive reaction. |
| 214-112-8 | —O Et | 5 ml | 2 ml | 3 g | 20 | Very little reaction as judged visually. Small amt. gel; most liquid silicone left. |
| 214-113-8 | —O Et | 5 ml | 2 ml | 3 g | 60 | Extensive reaction. Stiff transparent gel. Skin test: judged better than Example 214-112-7 |
| 214-116-9 | —O Me | 5 ml | 0.5 ml | 0.5 g | 20 | Clear colorless liquid; 2 mm solid gel on bottom of vial. Added 15 ml $H_2O$ & mixed --> turbid susp. little foaming; 8da later→ gel. |
| 214-116-10 | —O Et | 5 ml | 0.5 ml | 0.5 g | 20 | Clear slightly amber liquid with foaming; transparent solid on bottom. Added 15 ml $H_2O$ & mixed --> turbid suspension (much foaming). 8 days later: had formed clear liquid - no gel. |

TABLE 2

| Example | Silicone substituents | Amt Silicone | Amt Glycerol | Amount Bronopol | Hrs. @ 200° F. | Result |
| --- | --- | --- | --- | --- | --- | --- |
| 214-116-11 | —O Me | 5 ml | 0.2 ml | 0.1 g | 20 | Clear colorless liquid with solid transparent layer on bottom. 15 ml $H_2O$ added & mixed - turbid suspension --> no foam. 8 days later: had formed stiff gel throughout. |
| 214-116-12 | —OEt | 5 ml | 0.2 ml | 0.1 g | 20 | Clear, pale amber liquid with small translucent deposit on bottom. 15 ml $H_2O$ added & shaken-→foam. 8days later: clear liquid, no gel. |
| 214-133-Sup.1 | —OEt | 20 ml | 0 | 2.0 g | 20 | $H_2O$ extraction→ 75 ml ext., 3.8 g dry wt. Excellent cosmetic appeal. |

It will thus be seen that the objects set forth above, among those made apparent by the description, are attained by the inventive reaction and the silicone products produced thereby.

The inventive scope is now defined in the following claims.

The invention claimed is:

1. A method of producing a water soluble silicone comprising:
    chemically reacting a polyalkoxysiloxane with an aliphatic alcohol by means of a reaction mixture in order to produce a silicone material;
    obtaining a water soluble portion from the produced silicone material by a recovery mechanism selected from the group consisting of centrifugation, decantation and filtration; and
    recovering any water insoluble hydrophilic residue material produced as a result of carrying out said obtaining step.

2. The method of claim 1, wherein said polyalkoxysiloxane includes alkoxy groups selected from the group consisting of methoxy and ethoxy.

3. The method of claim 1, wherein the aliphatic alcohol is selected from the group consisting of glycerol and 2-bromo-2-nitropropane-1,3-diol.

4. The method of claim 1, wherein the reacting step is carried out by adding to the reaction mixture one of an acidic catalyst selected from the group consisting of hydrochloric acid and trichloroacetic acid and a basic catalyst selected from the group consisting of N-ethyldiisopropylamine and triethylamine.

5. The method of claim 1, wherein the reacting step is carried out at a temperature of between 140° F. and 300° F.

6. The method of claim 2, further including the step of removing produced methanol or ethanol by bubbling a gas through the reaction mixture.

7. The method of claim 6, wherein the gas is selected from the group consisting of air and nitrogen.

8. The method of claim 1, wherein the polyalkoxysiloxane is polydialkoxysiloxane.

9. A method of producing a water soluble silicone material comprising:
    chemically reacting a polyalkoxysiloxane with an aliphatic alcohol by means of a reaction mixture in order to produce a silicone material;
    obtaining a water soluble portion from the produced silicone material by a recovery mechanism selected from the group consisting of centrifugation, decantation and filtration;
    wherein the water soluble portion of the produced silicone material is purified by means of fractionation.

10. The method of claim 9, wherein fractionation is carried out by chromatography selected from the group consisting of size exclusion chromatography and high performance liquid chromatography.

11. The method of claim 9, wherein said polyalkoxysiloxane includes alkoxy groups selected from the group consisting of methoxy and ethoxy.

12. The method of claim 9, wherein the aliphatic alcohol is selected from the group consisting of glycerol and 2-bromo-2-nitropropane-1,3-diol.

13. The method of claim 9, wherein the reacting step is carried out by adding to the reaction mixture one of an acidic catalyst selected from the group consisting of hydrochloric acid and trichloroacetic acid and a basic catalyst selected from the group consisting of N-ethyldiisopropylamine and triethylamine.

14. The method of claim 9, wherein the reacting step is carried out at a temperature of between 140° F. and 300° F.

15. The method of claim 11, further including the step of removing produced methanol or ethanol by bubbling a gas through the reaction mixture.

16. A water soluble silicone product prepared by a process comprising the step of chemically reacting a polydialkoxysiloxane with an aliphatic alcohol in a reaction mixture in order to produce a modified silicone material;
    wherein polydialkoxysiloxane includes alkoxy groups selected from the group consisting of methoxy and ethoxy; and
    wherein the aliphatic alcohol is selected from the group consisting of glycerol and 2-bromo-2-nitropropane-1,3-diol.

17. The product of claim 16, wherein the chemical reacting step is carried out by adding to the reaction mixture one of an acidic catalyst selected from the group consisting of hydrochloric acid and trichloroacetic acid and a basic catalyst selected from the group consisting of N-ethyldiisopropylamine and triethylamine.

18. The product of claim 16, wherein the chemical reacting step is carried out at a temperature of between 140° F. and 300° F.

19. The product of claim 16, wherein the process further includes the step of removing produced methanol or ethanol by bubbling a gas through the reaction mixture.

20. The product of claim 16, wherein said process further includes the step of obtaining a water soluble silicone portion from the silicone material produced as a result of the chemical reacting step by carrying out a recovery mechanism selected from the groups consisting of centrifugation, decantation and filtration.

21. The product of claim 20, further including the step of purifying the water soluble portion produced by said obtaining step by means of fractionation.

22. A method of producing a water soluble silicone comprising:
    chemically reacting a polydialkoxysiloxane with an aliphatic alcohol by means of a reaction mixture in order to produce a silicone material;
    wherein said polydialkoxysiloxane includes alkoxy groups selected from the group consisting of methoxy and ethoxy; and
    wherein the aliphatic alcohol is selected from the group consisting of glycerol and 2-bromo-2-nitropropane-1,3-diol.

23. The method of claim 22, wherein the reacting step is carried out by adding to the reaction mixture one of an acidic catalyst selected from the group consisting of hydrochloric acid and trichloroacetic acid and a basic catalyst selected from the group consisting of N-ethyldiisopropylamine and triethylamine.

24. The method of claim 22, wherein the reacting step is carried out at a temperature of between 140° F. and 300° F.

25. The method of claim 22, further including the step of removing produced methanol or ethanol by bubbling a gas through the reaction mixture.

* * * * *